United States Patent [19]

Cox et al.

[11] Patent Number: 4,764,075
[45] Date of Patent: Aug. 16, 1988

[54] LOAD ELEVATOR

[75] Inventors: Bruce N. Cox, Yinnar South; Lindsay Wakefield, Toorak, both of Australia

[73] Assignee: Safetech Pty. Ltd., Victoria, Australia

[21] Appl. No.: 22,218

[22] Filed: Mar. 5, 1987

Related U.S. Application Data

[63] Continuation-in-part of Ser. No. 854,526, Apr. 22, 1986, abandoned.

[51] Int. Cl.⁴ .............................. A47F 1/00
[52] U.S. Cl. ............................ 414/99; 211/59.3; 267/166; 312/71; 414/118; 414/786
[58] Field of Search .......... 414/99, 118, 786; 267/61 R, 166; 271/160, 219; 211/59.3; 312/71, 306

[56] References Cited

U.S. PATENT DOCUMENTS

| | | | |
|---|---|---|---|
| 1,212,341 | 1/1917 | Fowler | 271/160 X |
| 2,806,607 | 9/1957 | Korngold et al. | 211/59.3 X |
| 2,980,287 | 4/1961 | Fisher | 312/71 |
| 3,091,503 | 5/1963 | Fisher | 312/71 |
| 3,659,913 | 5/1972 | Waldron et al. | 312/71 |
| 3,694,044 | 9/1972 | Cummings | 312/71 |
| 3,738,722 | 6/1973 | Kooiman | 211/59.3 X |
| 4,007,925 | 2/1977 | DeRyke et al. | 414/118 X |

Primary Examiner—Leslie J. Paperner
Attorney, Agent, or Firm—Burns, Doane, Swecker & Mathis

[57] ABSTRACT

A load elevator for pallets comprising a load supporting platform connected to a base frame through scissor linkages, a pair of compression springs interposed between the platform and the base frame, the capacity of said springs being selected according to the formula:

$$C = W \times \frac{1}{1 + \left(\frac{H - 900}{500}\right)}$$

wherein C is the spring capacity in kilograms, W is the weight of the load in kilograms and H is the height of the load in millimeters, such that when a predetermined load W is supported by the platform, the springs will be substantially fully compressed and will operate to automatically elevate the platform as part of the load is removed from the platform whereby the top portion of the load remains at substantially the same height.

7 Claims, 6 Drawing Sheets

LOAD ELEVATOR

CROSS REFERENCE TO RELATED APPLICATION

This application is a continuation-in-part application of patent application Ser. No. 854,526, filed Apr. 22, 1986 for Load Elevator, now abandoned.

FIELD OF THE INVENTION

This invention relates to load elevators, particularly, but not exclusively, pallet elevators of the type which are used to elevate a palletized load to the best level for manual loading and unloading.

BACKGROUND OF THE INVENTION

The loading and unloading of goods from pallets is a common cause of back injury because operators must lift the load from increasingly low positions as the load level reduces with unloading.

Load elevators which comprise a load supporting platform which is elevated by an electric motor or by hydraulics are known but are not widely used. Such load elevators are expensive and rely on the operator to maintain the load at the correct level as it is unloaded. Thus, if the operator does not adjust the position of the pallet as the load is removed, unloading of the pallet may still result in back injuries.

The use of spring biased platform for the elevation and lowering of loads as they are unloaded or loaded has been proposed in the past. For example, U.S. Pat. Nos. 1,212,341 Fowler and 2,980,287 and 3,091,503 Fisher shows spring biased mechanisms which are intended to maintain a loader at a convenient height as it is unloaded. However, the present inventors doubt that the device according to the Fowler disclosure would have ever achieved commercial realization, the springs being totally inadequate, or that the device as proposed by Fisher reached any application wider than the specific use mentioned in the specification, that is, spool troughs. None of the prior art disclosures address the question of how the springs are designed to take account of loads of varying height and weight, and as the present inventors discovered, the solution to this problem was not at all simple. It will be appreciated that the springs shown in the Fowler disclosure would simply not be capable of elevating the load of steel sheeting mentioned in the disclosure while the device as proposed by Fisher were only ever intended to be used with textile spools of a constant weight, size and number.

When the different nature of various loads is considered, it will be appreciated that the selection of the correct spring characteristics to maintain the top of the load at a relatively constant height as it is unloaded will not simply be a function of the weight of the load but also of its height. For example, a heavy dense load of the same weight as a load of lighter unit weight having a greater height will require completely different spring characteristics in order to cause elevation of the load in the correct manner as the load is unloaded.

BRIEF SUMMARY OF THE INVENTION

As a result of considerable research, the present inventors have developed a load elevator and a range of special springs for use with the elevator by means of which a large range of load weights and heights can be successfully handled.

It is the object of the present invention to provide a load elevator which is simple and relatively inexpensive in construction and which automatically elevates the load to the required position for unloading and lowers the load to the required position during loading.

In a first aspect, the invention provides a load elevator comprising a base member and a load supporting member, linkage means interconnecting said base member and said load supporting member so as to maintain said load supporting member in a generally parallel orientation to said base member, and compression spring means interposed between said base member and said load supporting member, said spring means having a spring capacity which is selected according to the weight of the load and the height of the load above said load supporting member whereby said spring means are substantially fully deformed when a predetermined load is applied to said load supporting member and the upper portion of said load is supported at a predetermined height, said spring means causing elevation of said load supporting member as load is removed from said load supporting member to maintain the upper portion of said load supporting member substantially at said predetermined height and vice versa as the same type of load is applied to said load supporting member.

In a preferred form of the invention, at least two spaced compression springs are used to apply the restoring force to the load supporting member, the spring capacity of said springs being selected according to the relationship:

$$C = W \times \frac{1}{1 + \left(\frac{H - 900}{500}\right)}$$

In which C=the required spring capacity in kilograms, W is the weight of the load in kilograms, and H is the height of the load above said load supporting member in millimeters.

By the use of spaced compression springs in accordance with the above relationship, complete compression of the springs will occur when a load W is applied to said load supporting member and the springs will not cause elevation of the load supporting member until a predetermined portion of the load has been removed from the load supporting member.

The linkage means is preferably in the form of "scissor" or "lazy tong" linkages arranged on either side of the load elevator. Such an arrangement ensures that the load supporting member is always generally horizontal as the load is elevated or lowered. The linkages are also preferably tied to each other by means of cross rods to prevent sideways movement of the load supporting member relative to the base.

In another aspect, the invention provides a set of springs having a spring capacity C in kilograms for a load elevator in which the load having a predetermined weight W in kilograms and a predetermined height H in millimeters is to be maintained substantially at a predetermined height during unloading and loading, said springs being selected according to the relationship:

$$C = W \times \cfrac{1}{1 + \left(\cfrac{H - 900}{500}\right)}$$

BRIEF DESCRIPTION OF THE DRAWINGS

One particularly preferred form of the invention will now be described with reference to the accompanying drawings in which.

DESCRIPTION OF PREFERRED EMBODIMENT

Referring firstly to FIGS. 1 to 4 of the drawings, the load elevator will be seen to comprise a base frame 1 and a load supporting frame 2 by means of which a pallet P may be supported, said frames 1, 2 being separated by a pair of compression springs 3, 4 and being interconnected by scissor or lazy tong mechanisms 5, 6 disposed on either side of the frames 1, 2. When a pallet having a predetermined load is placed on the load supporting frame, the springs 3, 4 will be fully compressed and will assume the condition shown in FIG. 2 of the drawings in which the frame 2 bears on stops S on the frame 1. As the load is removed from the pallet, the springs 3, 4 will become gradually more extended thereby automatically elevating the load and pallet so that it may be unloaded from a convenient height. To prevent rapid movements of the elevator, hydraulic or pneumatic dampers D are preferably fitted to the mechanisms 5 and 6, as shown. Alternatively, as load is applied to the pallet, the springs 3, 4 will become more compressed thereby lowering the load to enable loading from the most convenient height.

The base frame 1 comprises spaced pairs of cross members 7, 8 and 9, 10 supporting a four of spaced longitudinal members 11, 12, 13 and 14 which together with the cross members define a rigid frame. Standard castor wheels W are secured to plates attached to the longitudinal members 13 and 14 and 9, 10 adjacent their free ends so that the base frame is mobile and stable. Alternatively adjustable feet (shown in broken outline in FIG. 3) may replace the castors W. Seats 15 for the springs 3, 4 are also secured to the cross members 7, 8 and 9, 10 in the position shown most clearly in FIG. 3 of the drawings.

The load supporting frame 2 has a similar structure with cross members 16, 17 and 18, 19 to which longitudinal frame members 20, 21 are secured and which support seats 22 for the springs 3, 4.

Each scissor linkage 5, 6 comprises an outer linkage member 23, 24 and an inner linkage member 25, 26 each of which is attached by a pivot rod 27 to one end of the frame members 11 and 12 and by a pivot rod 28 to one end of the frame members 20 and 21 while the other ends of said linkage members are attached to rollers 29, 30 which run in the other ends of the frame members 11, 12 and 20, 21 with their axles engaging elongate slots 31, 32. A further pivot rod 33 interconnects the linkage members centrally to complete the scissor linkage. The pivot rods 27, 28, 29, 30 and 33 are located in tying tubes 34 which interconnect the inner linkage members 25, 26 and resist lateral displacement of said frame 2 relative to said frame 1.

Figure 5:
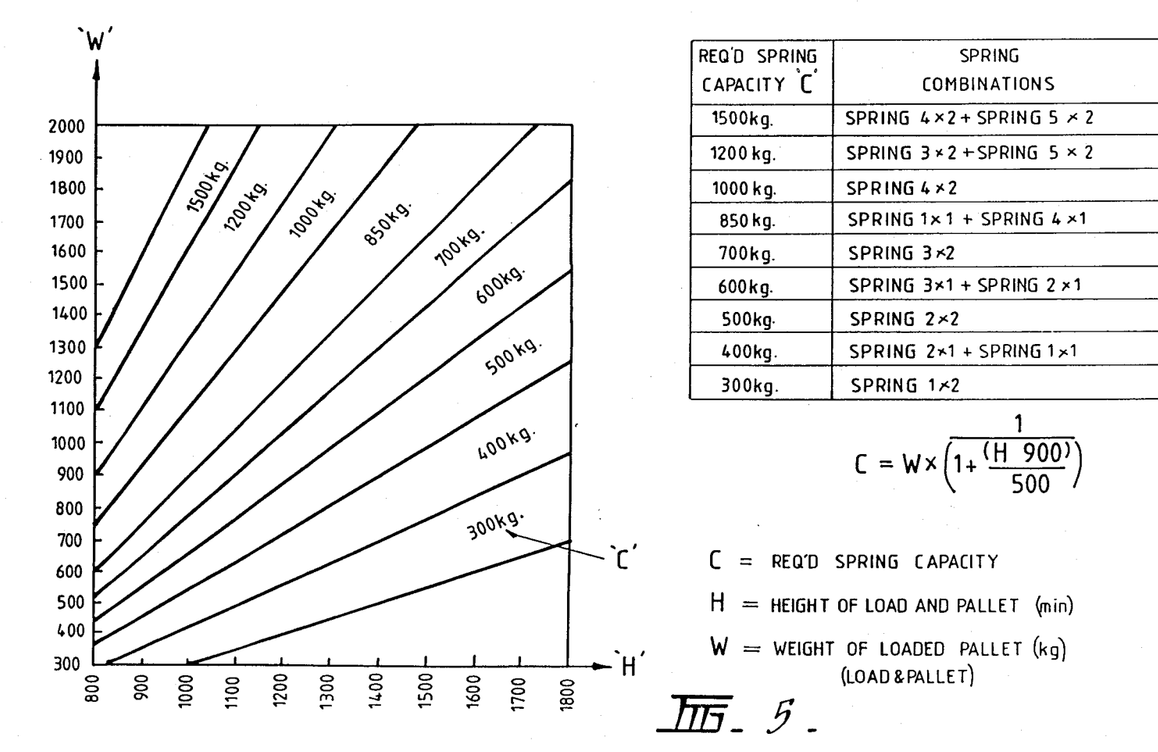
FIG. 5 is a graph showing the spring capacity based on various selected load weights and heights.

The spring lifting capacity of the springs 3, 4 is selected according to the weight W and the height H of the load intended to be supported on a pallet P supported by the load supporting frame 2. Research has shown that by carefully selecting the spring lifting capacity of the springs 3, 4 according to the formula:

$$C = W \times \cfrac{1}{1 + \left(\cfrac{H - 900}{500}\right)}$$

in which C=the required spring capacity in kilograms, W=the weight of the load in kilograms, and H is the height of the load above said load supporting member in millimeters, the upper portion of the load for unloading and loading purposes may be maintained at a substantially constant level suitable for unloading without placing undue stress on the back of the operator. To facilitate the easy selection of spring capacity according to the above relationship, the chart shown in FIG. 5 of the drawings has been developed. Also associated with the chart is a list of spring combinations by means of which the required spring capacity may be achieved. Each spring included in the list of spring combinations has been specially developed to provide the required spring characteristics to achieve the necessary load elevation for loads of a wide range of weights and heights. Each spring has been designed to balance the stress in the spring and the solid length (full compression) of the spring so that the solid length of each spring is slightly less than the lowest height of the elevator, that is, the position at which the frame 2 contacts the stops S. The characteristics of the specially designed springs are as follows:

| Spring 1 Capacity 150 kg | | |
|---|---|---|
| F.L. = 850 mm | F = 165 kg | Preload = 48 kg |
| O.D = 195 mm | τ = 479 MPa | Rate = 258 kg/m |
| Wφ = 12.0 (unground) | Bar L = 8400 mm | (@ 14.5 total coils) |
| N = 13 active coils | Spring Weight 7.45 kg | |
| R.H. Coiled | S.L. = 180 mm | |

| Spring 2 Capacity 250 kg | | |
|---|---|---|
| F.L. = 800 mm | F = 254 kg$_2$ | Preload = 58 kg |
| O.D = 195 mm | τ = 574 MPa | Rate = 431 kg/m |
| Wφ = 13.0 (unground) | Bar L 7200 mm | (@ 12.5 Total coils) |
| N = 11 active coils | Spring Weight 7.49 kg | |
| R.H. Coiled | S.L. = 169 mm | |

-continued

Spring 3 Capacity 350 kg

| | | |
|---|---|---|
| F.L. = 750 mm | F = 318 kg, | Preload = 50 kg |
| O.D = 195 mm | τ = 575 MPa | Rate = 589 kg/m |
| Wφ = 14.0 (unground) | Bar L. = 7200 mm | (@ 12.5 total coils) |
| N = 11 active coils | Spring weight = 8.71 kg | |
| R.H. Coiled | S.L. = 182 MM | |

Spring 4 Capacity 500 kg

| | | |
|---|---|---|
| F.L. = 720 mm | F = 492 kg | Preload = 53 kg |
| O.D = 195 mm | τ = 723 MPa | Rate = 965 kg/m |
| Wφ = 15.0 Ground | Bar L = 600 mm | (@ 10.5 Total coils) |
| N = 9 active coils | Spring weight = 8.34 kg | |
| R.H. Coiled | S.L. = 165 mm | |

Spring 5 Capacity 250 kg

| | | |
|---|---|---|
| F.L. = 800 mm | F = 237 kg | Preload = 54 kg |
| O.D. = 160 mm | τ = 726 MPa | Rate = 402 kg/m |
| Wφ = 11.0 – Ground | Bar L = 5900 mm | (@ 12.5 Total Coils) |
| N = 11 active coils | Spring Weight = 4.40 kg | |
| L.H. Coiled | S.L. = 143 mm | |

F.L. = free length O.D. = overall diameter of spring, Wφ = wire diameter, N = number of active coils, F = actual force to compress spring to 210 mm, Preload = actual force to compress spring to 665 mm, τ = shear stress in spring at force F, S.L. = solid length.

It will be noted from the above data that each spring is preloaded when fitted to the load elevator so that the springs are compressed to a length of 665 mm. In each case the Solid Length of each spring is less than the lowest height of the load elevator: 200 mm, as shown in FIG. 6.

Our research and subsequent testing has shown that by using the spring combinations shown in FIG. 5 to achieve the required spring capacity dictated by the relationship defined above, the required elevation of the load as load is removed will be achieved and the upper portion of the load will be maintained at the ideal lifting height of 975 mm. Since spring 5 is designed to be inserted within one of the other springs, its coils are reverse rolled to prevent nesting between the coils of this spring and the outer spring.

Figure 6:
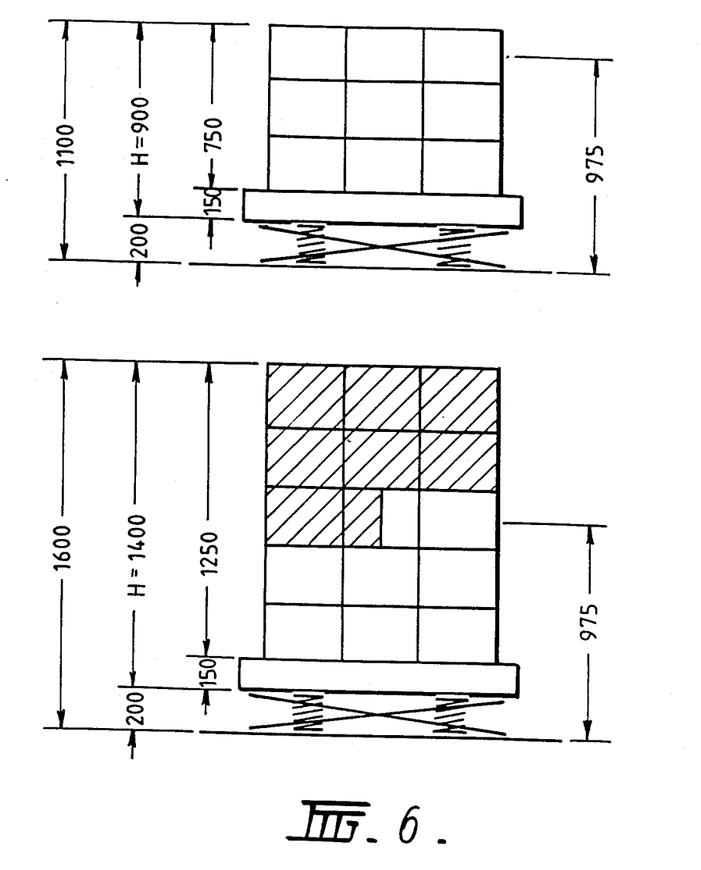
FIG. 6 contains schematic diagrams showing two different loads of the same overall weight but different height.

Reference to FIG. 6 of the drawings will show how a different height of load of similar weight will require a quite different spring capacity to achieve the required commencement of elevation of the load as the load is removed. The upper example shown in FIG. 6 comprises a pallet of cartons of overall weight W, each carton being 250 mm high which places the top of the load at H 900 mm above the load supporting member. This places the middle of the top layer of cartons at 975 mm which is the ideal lifting height. In this arrangement, the elevator starts to lift as material is removed from the top layer.

In the lower example shown in FIG. 6, a further two layers of cartons have been applied to the load, the weight of the load W remaining the same. This gives a height H of 1400 mm and since the top of the load is so far above the ideal lifting height of 975 mm, the top half of the load must be removed before the elevator starts to lift the load. If one applies the spring capacity formula to this load, $C = W \times \frac{1}{2}$. Thus, referring to the chart of FIG. 5, if the load weight W is 1200 kg in each case, the required spring capacity will in the first case be 1200 kg and in the second case will be 500 kg.

Figure 1:
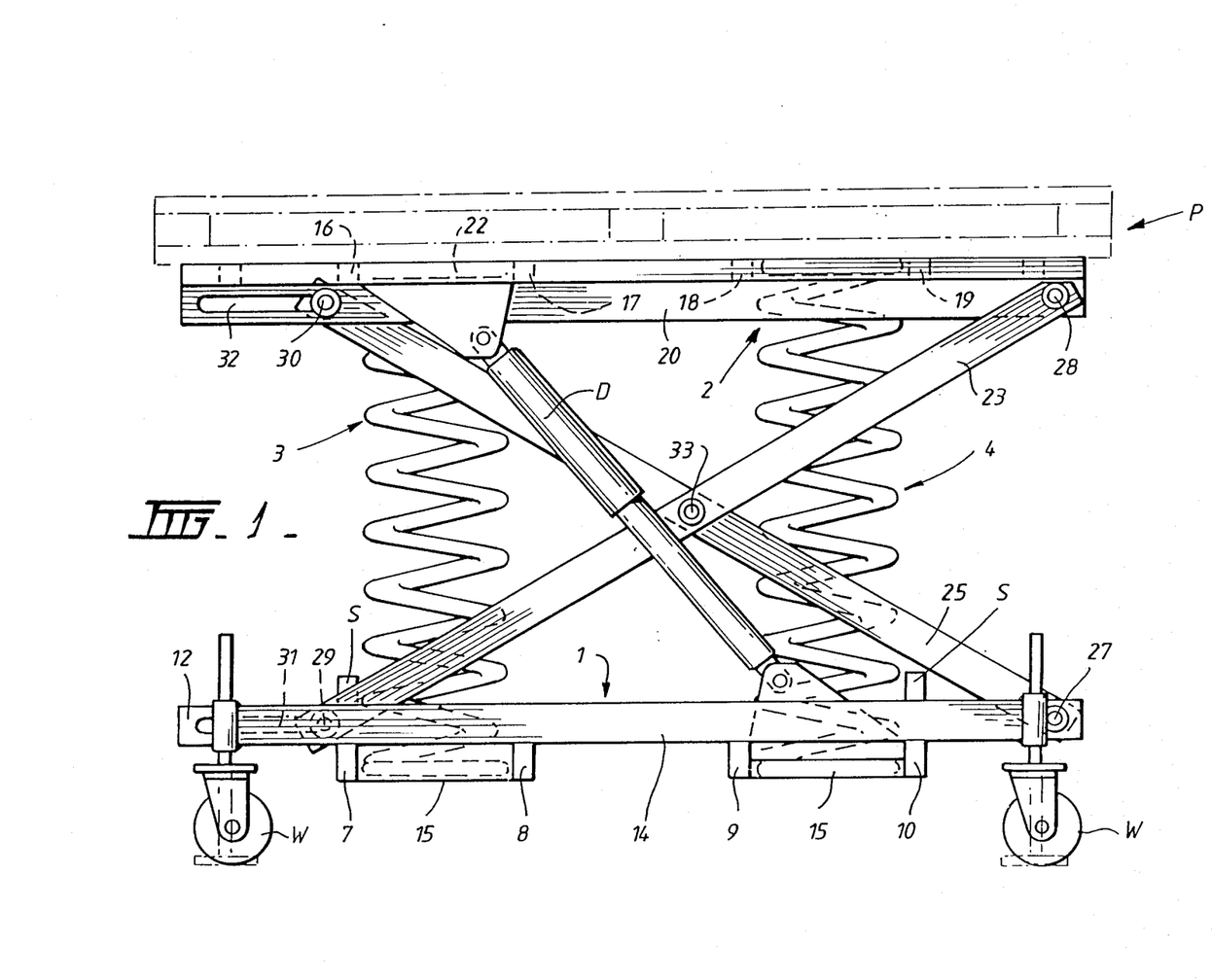
FIG. 1 is a side elevation of the load elevator embodying the invention.
Figure 2:
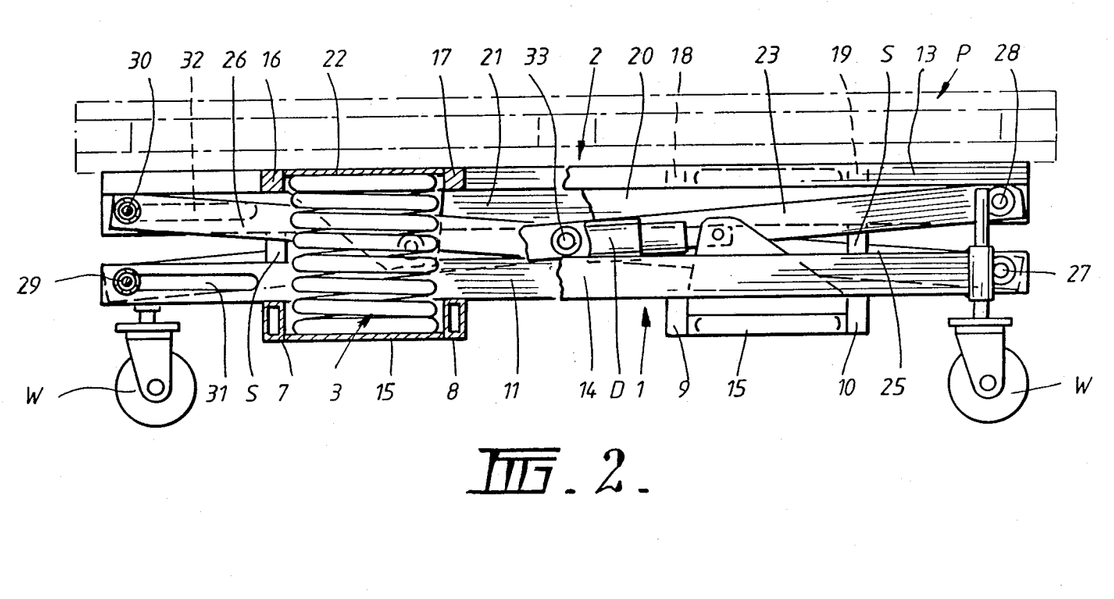
FIG. 2 is a further side elevation of the load elevator in the fully compressed position.
Figure 3:
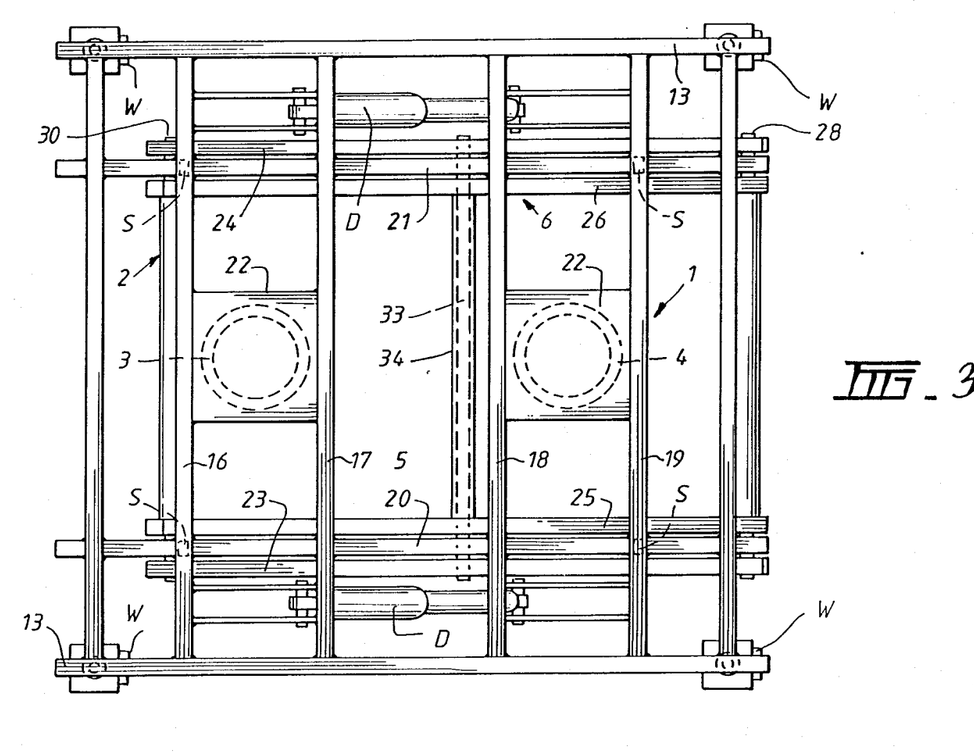
FIG. 3 is a plan view of the load elevator of FIG. 1 (the upper frame member not shown for clarity)
Figure 4:
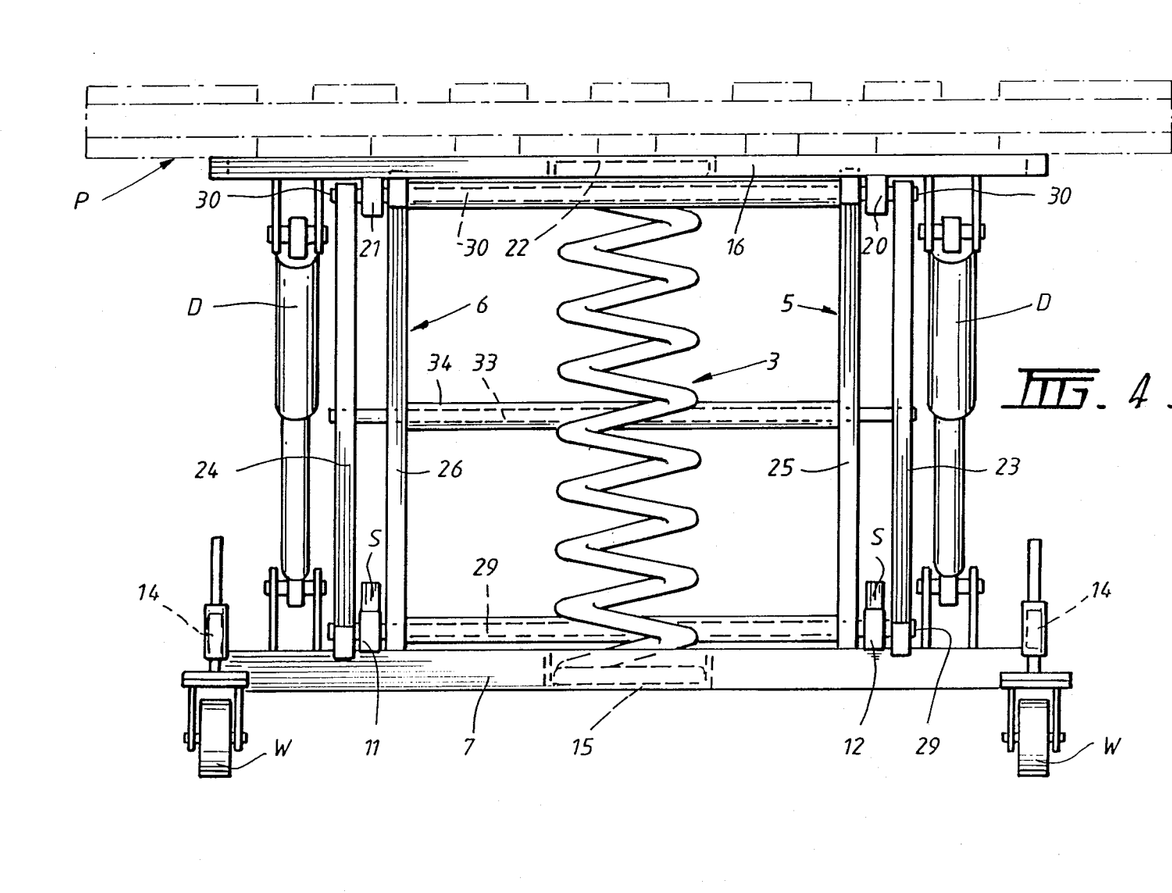
FIG. 4 is an end elevation of the load elevator shown in FIG. 1.

Thus when the springs are selected according to the chart of FIG. 5 for a load of a particular weight and height, the springs 3, 4 will be fully compressed in the manner shown in FIG. 2 of the drawings with the top frame 2 engaging the stops S. As a predetermined portion of the load is removed, as described in connection with FIG. 6, springs 3, 4 will automatically extend to elevate the load to a position from which the next layer may be removed at approximately the same height as the first layer or portion of the load, most preferably the ideal lifting height 975 mm. At this height, the unloading of the load will be less likely to cause back injury to the person who is performing the unloading.

It will be appreciated from the above that each load elevator will therefore be designed for a particular type of load although replacement springs may be supplied with an elevator so that by substituting springs a different load may be elevated by the same mechanism.

It will be appreciated from the above that the load elevator embodying the present invention provides a particularly simple and relatively inexpensive means of automatically elevating a load as it is unloaded. Thus, the operator unloading the load does not have to actuate an electric motor or hydraulic system to elevate the load as the pallet is unloaded. The components of the elevator are particularly durable and would require little or no servicing in use.

It will also be appreciated that the wheels may be replaced by fixed feet or the base frame may form part of a fixed structure where mobility is not required. The fixed feet may for example be arranged at such a height that the base frame may be lifted by means of a forklift truck to transport the load and elevator as one unit. Similarly, the cross members 16, 17 and 18, 19 may support removable extension bars to increase the size of the load supporting frame for larger loads. Furthermore, the elevator may form part of a manually operated or motor driven hand truck where permanent additional mobility is required.

We claim:

1. A load elevator comprising a base member and a load supporting member, linkage means interconnecting said base member and said load supporting member in a generally parallel orientation to said base member, and compression spring means interposed between said base member and said load supporting member, said spring means comprising at least two spaced compression springs having a spring capacity C in kilograms which is selected according to the weight W of the load in kilograms and the height H of the load in millimeters above said load supporting member to satisfy the relationship:

$$C = W \times \cfrac{1}{1 + \left(\cfrac{H - 900}{500}\right)}$$

so that said spring means are substantially fully deformed when a predetermined load is applied to said load supporting member and the upper portion of said load is supported at a predetermined height, said spring means causing elevation of said load supporting member as load is removed from said load supporting member to maintain the upper portion of said load supporting member substantially at said predetermined height and vice versa as the same type of load is applied to said load supporting member.

2. The elevator of claim 1, wherein said linkage means comprises a scissor linkage arranged at either side of the base member and the load supporting member and pivotally attached thereto, and tie means interconnecting said scissor linkages to resist lateral displacement of said load supporting member relative to said base member.

3. The elevator of claim 2, wherein each scissor linkage comprises an outer linkage member and an inner linkage member, one end of each linkage member being attached to one end of the base member and to the corresponding end of the load supporting member by a pivot means, roller means mounted at the other ends of said linkage members and engaging tracks in or on the other ends of said base member and said load supporting member.

4. A set of springs having a spring capacity C in kilograms for a load elevator in which the load has a predetermined weight W in kilograms and a predetermined height H in millimeters is to be maintained at a substantially predetermined height during unloading and loading, said springs being selected according to the relationship:

$$C = W \times \cfrac{1}{1 + \left(\cfrac{H - 900}{500}\right)}$$

5. In a load elevator of the type having a load supporting member that is spaced from a base member by means of a compression spring arrangement, a method for regulating the height of said load elevator such that the upper portion of a load on said load supporting member is generally maintained at a predetermined height as portions of said load are added to or removed from said load supporting member, comprising the step of selecting at least one compression spring in said arrangement such that the capacity of said arrangement satisfies the relationship:

$$C = W \times \cfrac{1}{1 + \left(\cfrac{H - 900}{500}\right)}$$

where
 C is the spring capacity of the compression spring arrangement in kilograms,
 H is the weight of the load in kilograms, and
 H is the height in millimeters of the load above said supporting member.

6. The method of claim 5 wherein said compression spring arrangement comprises at least two spaced compression springs, and wherein said selecting step comprises the step of choosing each of said springs so that their combined capacity satisfies said relationship.

7. The method of claim 6 wherein said selecting step comprises the steps of providing a plurality of compression springs having different respective capacities and choosing two or more of said springs the sum of whose individual capacities is equal to said capacity C.

* * * * *